United States Patent Office 3,251,802
Patented May 17, 1966

3,251,802
PROCESSES FOR RECOVERING POLYCARBONATES FROM STABLE EMULSIONS USING INORGANIC SALTS WHICH FORM HYDRATES TO BREAK THE EMULSION
Ann V. Pinter, Morristown, N.J., assignor to Allied Chemical Corporation, New York, N.Y., a corporation of New York
No Drawing. Filed Aug. 31, 1961, Ser. No. 135,137
11 Claims. (Cl. 260—47)

This invention is directed to processes by which a purified polycarbonate is recovered from stable, aqueous emulsions of a solution of the polycarbonate in an organic solvent and an aqueous solution of inorganic salt. More particularly it is directed to a single step procedure by which those emulsions can be broken and a solution of the polycarbonate in the organic solvent substantially free from inorganic salts is obtained by addition of an inorganic salt capable of forming a hydrate by absorption of water.

It is known to produce polycarbonates of bisphenols by phosgenating with gaseous phosgene an intimate mixture or emulsion of an aqueous solution of a caustic alkali and a bisphenol, alone or together with an organic dihydroxy compound other than a bisphenol, and an organic solvent, such as a saturated, aliphatic chloride, for the phosgene gas and for the polycarbonate which is produced. When the resulting emulsion of aqueous and organic solvent phases does not spontaneously separate into two liquid layers on standing, the emulsion is commonly mixed with water, an inorganic or organic acid, such as hydrochloric or acetic acid, or an organic liquid diluent, such as acetone or additional amounts of the organic solvent, to break the emulsion so that it separates into a solution of the polycarbonate in the organic solvent and an aqueous solution containing inorganic chloride and carbonate salts formed by the reaction of the phosgene, and any unreacted phenate. The organic solvent phase containing the dissolved polycarbonate then can be layer separated from the aqueous phase and the polycarbonate recovered and purified by conventional procedures.

Furthermore, it has been found that a polycarbonate product can be prepared by phosgenating an intimate mixture of aqueous caustic alkali solution and a solution in an organic solvent for the phosgene of a material formed by heating a bisphenol with a drying oil. The resulting solution of polycarbonate in the organic solvent forms an emulsion with the aqueous phase present containing inorganic salts. These methods for preparing polycarbonates and the products thus produced are described and claimed in United States patent application Serial No. 109,489, filed May 12, 1961, of Rudolph D. Deanin and Ann V. Pinter now U.S. Patent 3,157,606, and constitute reacting an ester forming derivative of carbonic acid such as phosgene or a carbonic acid diester with the reaction product obtained by heating a mixture of fatty oil such as a drying, semi-drying or non-drying oil and a bisphenol of the structure

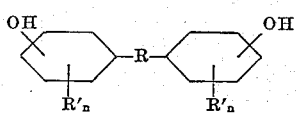

wherein R is a divalent alkane or saturated alicyclic radical or a divalent aryl or aralkyl radical containing only aromatic unsaturation, R' is a monovalent alkane radical and n is an integer from 0 to 4, and the derivatives of those bisphenols which contain halogen attached to carbon in an aromatic ring.

In preparing some polycarbonates by the foregoing procedures, especially in preparing the polycarbonates of bisphenols with other dihydroxy compounds or of the products produced by heating a drying oil and a bisphenol, I have found the product can be an unexpectedly stable emulsion of aqueous and organic solvent phases. These stable emulsions are not broken by addition of water, the organic solvent for the polycarbonate which is present, hydrochloric acid or acetone. Nor are they broken by addition of numerous other agents heretofore used to break aqueous emulsions formed by phosgenating dispersions of an aqueous, caustic alkali-bisphenate solution and the organic solvent for the phosgene and polycarbonate.

I have now discovered that by addition of an inorganic salt capable of forming a hydrate with water to those stable emulsions, the emulsions are broken and the salt hydrated by the water absorbed from the aqueous emulsion does not form, as would be expected, a sticky mass containing much of the polycarbonate solution mixed with the solid hydrated salt, from which it would be impracticable to separate the solution of polycarbonate. Instead these salts were found to form a compact, adherent mass from which the polycarbonate solution is readily separable by filtration or, in large part, merely by pouring off the supernatant polycarbonate solution while retaining behind the mass of hydrated salt and precipitated salt impurities originally present in the stable emulsion. Some additional amounts of the polycarbonate adhering to the hydrated salt and salts precipitated from the solution may be recovered, if desired, by washing the solid with a solvent for the polycarbonate.

By evaporating the solvent from the solution of polycarbonate thus obtained I have found that the recovered polycarbonate is surprisingly pure, leaving only about 0.1% ash on combustion.

While I prefer to employ anhydrous calcium chloride as the salt forming hydrates with water which is contacted with the stable emulsion, nevertheless, salts such as anhydrous sodium sulfate, magnesium sulfate or calcium sulfate, the mono- or dihydrate of calcium chloride or plaster of Paris ($CaSO_4 \cdot \frac{1}{2}H_2O$) can be used. The use of the low hydrated salts instead of the anhydrous salts is at a sacrifice in the capacity of the salt with respect to the amount of water it can take up from the emulsion. For that reason, their use is less desirable than the use of the anhydrous salts.

The following examples embodying the processes of my invention further illustrate and describe that invention.

*Example 1*

A mixture of 40 gms. 2,2-bis(4-hydroxyphenyl) propane (bisphenol-A) and 19 gms. of dehydrated castor oil was heated to 270° C. over a period of 40 minutes, held at 270°–320° C. for 30 minutes and then cooled to 30° C. over a period of 45 minutes. The resulting material was dissolved in 500 cc. methylene chloride and added to a solution of 31.5 gms. of 95% caustic soda in 500 cc. of water in a reaction vessel provided with a stirrer, a reflux condenser and a dip tube. The liquids were stirred with a flow of nitrogen gas passed through the dip tube to remove the air present, and 6.4 cc. of a 10% aqueous solution of benzyltriethyl ammonium chloride were added. The flow of nitrogen gas was then discontinued and 27.5 gms. of gaseous phosgene was bubbled into the stirred mixture at a substantially uniform rate over a one hour period, with the reaction mixture cooled to remove exothermic heat of reaction and maintain it at about 30° C. Following completion of the introduction of phosgene gas, the reaction mixture was stirred for another one hour period during which it was maintained at 30° C. The resulting emulsion of the solution of drying oil modified polycarbonate in methylene chloride and the aqueous solution containing water soluble salts, principally sodium chloride and sodium carbonate, was stable and was not broken by addition of water, methylene chloride, hydrochloric acid or acetone.

Addition to the emulsion thus produced of about 200 gms. of anhydrous calcium chloride for every 100 cc. of the emulsion, an excess of that required to form the hexahydrate of the calcium chloride with the water present, resulted in absorption of all the water present in the emulsion. The hydrated calcium chloride formed a compact, adherent mass accompanied by a white powdery precipitate of water soluble salt impurities present in the original emulsion. The hydrated calcium chloride and the precipitated salts were readily separated from the polymer solution in methylene chloride by filtration. The filtrate was a clear, pure solution of polymer. The polymer recovered by evaporation of the methylene chloride solvent left only 0.1% ash on combustion.

*Example 2*

Dehydrated castor oil amounting to 22.2 gms. and 37 gms. of bisphenol-A were mixed together, heated to 270°–320° C. over a half hour period, held at 270°–320° C. for ½ hour and then cooled to 30° C. over another ½ hour. The resulting material was dissolved in 500 cc. methylene chloride, mixed with aqueous caustic soda and phosgenated, employing the same amount of caustic soda, water, benzyltriethyl ammonium chloride catalyst, phosgene gas and the same reaction conditions as described for Example 1 above.

The resulting reaction product was a stable emulsion of an aqueous phase and a methylene chloride phase containing in solution the drying oil modified polycarbonate of bisphenol-A.

Anhydrous calcium chloride amounting to about 100 gms. was added to 100 cc. of the emulsion and it was allowed to stand in contact with the calcium chloride until the water present had been taken up by the calcium chloride. The resulting clear, pure solution of copolycarbonate in methylene chloride was filtered off from the calcium chloride and the inorganic salts precipitated by thus breaking the emulsion and drying the polycarbonate solution.

*Example 3*

A reaction vessel was charged with 500 cc. methylene chloride and 6.4 cc. of a 10% aqueous solution of benzyltriethyl ammonium chloride. After sweeping out the air in the vessel with nitrogen gas, a solution of 31.5 gms. of 95% caustic soda and 19 gms. each of bisphenol-A and resorcinol in 500 cc. of water was added to the stirred reaction mixture simultaneously with the passage of 27.5 gms. phosgene gas into the reaction mixture over a one hour period. The temperature of the mixture was maintained at 30° C. The reaction mixture was stirred for another hour at 30° C. The resulting product was a stable emulsion, which could not be broken by addition of water, methylene chloride, acetone or hydrochloric acid.

Addition to 100 cc. of the emulsion thus produced of about 100 gms. of anhydrous calcium chloride, an excess of that required to form the hexahydrate of the calcium chloride with the water present, resulted in absorption of all the water present in the emulsion. The hydrated calcium chloride formed a compact adherent mass accompanied by a white powdery precipitate of the water soluble salt impurities present in the original emulsion. The hydrated calcium chloride and the precipitated salts were readily separated by filtration from the solution in methylene chloride of the pure polymer.

I claim:
1. The process for recovering a polycarbonate from a stable emulsion of aqueous, alkali metal chloride and alkali metal carbonate salt solution and a solution of the polycarbonate in an organic solvent which comprises breaking said stable emulsion and precipitating the inorganic salt impurities present by contacting said stable emulsion with an inorganic salt which forms a hydrate with water, and thereafter separating from the thus dried solution of polycarbonate in said organic solvent the salt hydrated by water absorbed from said emulsion accompanied by precipitated inorganic salts.

2. The process of claim 1 in which the stable emulsion comprises an aqueous salt solution and a solution in an organic solvent of a polycarbonate of a bisphenol with an organic dihydroxy compound other than a bisphenol.

3. The process of claim 1 in which the stable emulsion comprises an aqueous, inorganic salt solution and a solution in an organic solvent of a polycarbonate produced by heating a mixture of a bisphenol and a drying oil and phosgenating the resulting product in the presence of aqueous caustic alkali.

4. The process of claim 1 in which the organic solvent in the stable emulsion is methylene chloride.

5. The process of claim 1 in which the stable emulsion is one which is not broken by addition thereto of any member of the group consisting of water, the organic solvent present in the emulsion, hydrochloric acid and acetone.

6. The process of claim 1 in which the salt forming a hydrate with water is anhydrous calcium chloride.

7. The process of claim 4 in which the salt forming a hydrate with water is anhydrous calcium chloride.

8. The process of claim 5 in which the salt forming a hydrate with water is anhydrous calcium chloride.

9. The process for separating an organic polycarbonate from a stable emulsion comprising an aqueous, alkali metal chloride and alkali metal carbonate salt solution and a polycarbonate solution in an organic solvent for the polycarbonate which process comprises adding sufficient hydratable inorganic salt to form hydrate from substantially all of the water in said solution, and mechanically separating the resulting solid phase from organic solvent solution of polycarbonate.

10. The process for recovering a polycarbonate prepared by phosgenating a mixture of an aqueous solution of a caustic alkali and a reaction product of a drying oil and bisphenol of the structure

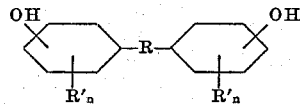

wherein R is a member selected from the group consisting of divalent alkanes, saturated alicyclic radicals, divalent aryl radicals and divalent aralkyl radicals containing only aromatic unsaturation, R' is a monovalent alkane radical and $n$ is an integer from 0 to 4, from a stable emulsion of a solvent solution of said polycarbonate in an aqueous solution of inorganic salts derived from reaction of said phosgene with said caustic alkali which comprises contacting said stable emulsion with an inorganic salt selected from the group consisting of anhydrous and incompletely hydrated sodium sulfate, magnesium sulfate, calcium sulfate and calcium chloride in an amount at least stoichiometrically sufficient to absorb all the water present in the emulsion, whereby the salts originally in aqueous solution are precipitated, and mechanically separating the thus purified organic solvent solution of polycarbonate from said hydrated and precipitated salts.

11. The process for recovering a polycarbonate prepared by phosgenating a mixture of an aqueous solution of a caustic alkali, resorcinol and a bisphenol of the structure

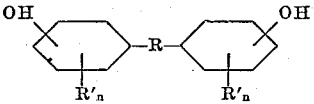

wherein R is a member selected from the group consisting of divalent alkanes, saturated alicyclic radicals, divalent aryl radicals and divalent aralkyl radicals containing only aromatic unsaturation, R' is a monovalent alkane radical and $n$ is an integer from 0 to 4, from a stable emulsion of a solvent solution of said polycarbonate in an aqueous solution of inorganic salts derived from reaction of said phosgene with said caustic alkali which comprises contacting said stable emulsion with an inorganic salt selected from the group consisting of anhydrous and incompletely hydrated sodium sulfate, magnesium sulfate, calcium sulfate and calcium chloride in an amount at least stoichiometrically sufficient to absorb all the water present in the emulsion, whereby the salts originally in aqueous solution are precipitated, and mechanically separating the thus purified organic solvent solution of polycarbonate from said hydrated and precipitated salts.

References Cited by the Examiner

UNITED STATES PATENTS

| | | | |
|---|---|---|---|
| 2,057,765 | 10/1936 | Brubaker | 260—94.7 |
| 2,607,753 | 8/1952 | Adams | 260—94.7 |
| 3,036,037 | 5/1962 | Howe | 260—47 |
| 3,157,606 | 11/1964 | Deanin et al. | 260—47 |

FOREIGN PATENTS 849,081   9/1960   Great Britain.

OTHER REFERENCES

Sutheim, Introduction to Emulsions, 1947, Chemical Publishing Co., New York, pages 11 and 195.

WILLIAM H. SHORT, *Primary Examiner*.
HAROLD N. BURSTEIN, *Examiner*.
LUCILLE M. MILLER, CHARLES A. WENDEL,
*Assistant Examiners*.